US007635155B2

(12) United States Patent
Guanzon et al.

(10) Patent No.: US 7,635,155 B2
(45) **Date of Patent: *Dec. 22, 2009**

(54) VEHICLE DOOR GRIP

(75) Inventors: Ruben E. Guanzon, Dublin, OH (US); Brian O'Hara, Powell, OH (US); Kris Lemmon, Dublin, OH (US)

(73) Assignee: Honda Motor Co., Ltd, Tokyo (JP)

( * ) Notice: Subject to any disclaimer, the term of this patent is extended or adjusted under 35 U.S.C. 154(b) by 1 day.

This patent is subject to a terminal disclaimer.

(21) Appl. No.: 12/100,561

(22) Filed: Apr. 10, 2008

(65) Prior Publication Data

US 2008/0209684 A1 Sep. 4, 2008

Related U.S. Application Data

(63) Continuation of application No. 11/339,073, filed on Jan. 24, 2006, now Pat. No. 7,380,864.

(60) Provisional application No. 60/646,872, filed on Jan. 25, 2005.

(51) Int. Cl.
*B60J 5/00* (2006.01)

(52) U.S. Cl. ......................... 296/146.1; 49/460; 16/412

(58) Field of Classification Search .............. 296/146.7, 296/146.1, 153; 49/460, 501, 502; 16/412, 16/430, 421, DIG. 24, DIG. 18, DIG. 19
See application file for complete search history.

(56) References Cited

U.S. PATENT DOCUMENTS

| | | | | | |
|---|---|---|---|---|---|
| 1,589,525 | A | * | 6/1926 | Freysinger | 292/347 |
| 2,325,292 | A | * | 7/1943 | Westrope | 297/411.21 |
| 2,355,978 | A | * | 8/1944 | Keeler | 16/412 |
| 4,497,514 | A | * | 2/1985 | Moriya et al. | 292/336.3 |
| 4,728,143 | A | * | 3/1988 | Tanino et al. | 296/153 |
| 4,858,973 | A | * | 8/1989 | Ogasawara et al. | 292/347 |
| 5,011,202 | A | * | 4/1991 | Kato et al. | 292/336.3 |
| 5,377,450 | A | * | 1/1995 | Varajon | 49/502 |
| 5,794,994 | A | * | 8/1998 | Miyagawa et al. | 292/336.3 |
| D458,107 | S | * | 6/2002 | Dodge et al. | D8/301 |
| 6,843,085 | B2 | * | 1/2005 | Dimig | 70/237 |
| 6,976,717 | B2 | * | 12/2005 | Barr et al. | 292/336.3 |
| 7,073,843 | B2 | * | 7/2006 | Schoemann et al. | 296/146.7 |
| 7,226,096 | B2 | * | 6/2007 | Ito et al. | 292/336.3 |
| 7,380,864 | B2 | * | 6/2008 | Guanzon et al. | 296/146.1 |
| 2002/0073510 | A1 | * | 6/2002 | Muneta | 16/412 |
| 2005/0218666 | A1 | * | 10/2005 | Odahara et al. | 292/336.3 |

* cited by examiner

*Primary Examiner*—Jason S Morrow
(74) *Attorney, Agent, or Firm*—Eley Law Firm Co.; Mark Duell; Michael A. Forhan

(57) ABSTRACT

A door grip for a vehicle. The door grip comprises a base member having a central opening. A bracket is positioned proximate an interior portion of the base member. A cover having a shape generally corresponding to the base member at least partially encloses the interior portion of the base member. A mounting portion of the bracket is attachable to a vehicle door interior panel such that a handle portion of the door grip is cantilevered away from a vehicle door interior panel.

19 Claims, 6 Drawing Sheets

VEHICLE DOOR GRIP

This application is a continuation of U.S. patent application Ser. No. 11/339,073, filed Jan. 24, 2006, which claims priority to U.S. provisional application 60/646,872, filed Jan. 25, 2005, the contents of both being incorporated herein by reference thereto.

FIELD

The present invention relates generally to a door grip arrangement for an automotive vehicle door assembly. In particular, this invention relates to a door grip located on an interior panel of a vehicle door to facilitate opening and closing of the door from within the passenger compartment.

BACKGROUND

A vehicle door assembly generally comprises an outer panel, an interior panel to which an interior door grip is attached, a lock mechanism and a window regulator device. The door grip is grasped by an occupant of the vehicle to open the door for egress and to close it during ingress. A release lever may be located proximate the door grip to unlatch the door, though in some vehicles the release lever is located remotely from the grip handle.

Vehicle door grips typically are longitudinally shaped to allow an occupant's hand to easily wrap around the grip when opening and closing the door. The grip is usually attached to the door at opposing ends of the grip in order to provide a sufficiently robust assembly capable of withstanding the forces imposed upon it when the grip (and, consequently, the door) is pushed and pulled by an occupant of the vehicle. Longitudinal grips are often incorporated into an armrest. Other configurations of longitudinal door grips include straps. A significant drawback of longitudinal door grips is that they limit the design of vehicle interiors because sufficient space must be made in the interior door panel to accommodate the relatively large grip and its opposing mounting points. Accordingly, there is a need for a robust door grip that consumes less space on the interior of the door and thus can be more flexibly located on the interior door panel.

SUMMARY

A cantilevered door grip is disclosed according to an embodiment of the present invention. A base member having a generally a rounded rectangular shape is formed with a lip and a channel to accommodate a structural reinforcing bracket. The bracket fits into the base member. A cover having a shape generally matching that of the base member fits over the base member, sandwiching the bracket between the base member and the cover. One or more fasteners are installed through openings in a handle portion of the base member, through openings in the bracket and into the cover to assemble together the base, bracket and cover. Trim caps may be inserted into the fastener openings to close them. A handle portion of the base may include a resilient overmold material to provide the grip with a pliable tactile sensation when grasped.

An aspect of the present invention is a door grip for a vehicle. The door grip comprises a base member having a central opening. A bracket is positioned proximate an interior portion of the base member. A cover having a shape generally corresponding to the base member at least partially encloses the interior portion of the base member. A mounting portion of the bracket is attachable to a vehicle door interior panel such that a handle portion of the door grip is cantilevered away from a vehicle door interior panel.

Another aspect of the present invention is a door grip for a vehicle comprising a base member having a generally rounded rectangular shape, a central opening, a lip and a channel. A bracket having a mounting portion and at least one support arm is positioned proximate an interior portion of the base member such that the support arm is proximate a handle portion of the base member and the mounting portion extends through the central opening of the base member. A cover having a shape generally corresponding to the base member at least partially encloses the interior portion of the base member. At least one fastener is provided to couple the cover to the base member and a trim cap disposed over the fastener. The mounting portion of the bracket is attachable to a vehicle door interior panel such that a handle portion of the door grip is cantilevered away from a vehicle door interior panel.

Yet another aspect of the present invention is a method of making a vehicle door grip. The method comprises the steps of providing a base member having a central opening, positioning a bracket proximate an interior portion of the base member, and coupling a cover to the base member so as to at least partially enclose the interior portion of the base member. A mounting portion of the bracket is attachable to a vehicle door interior panel such that a handle portion of the door grip is cantilevered away from a vehicle door interior panel.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
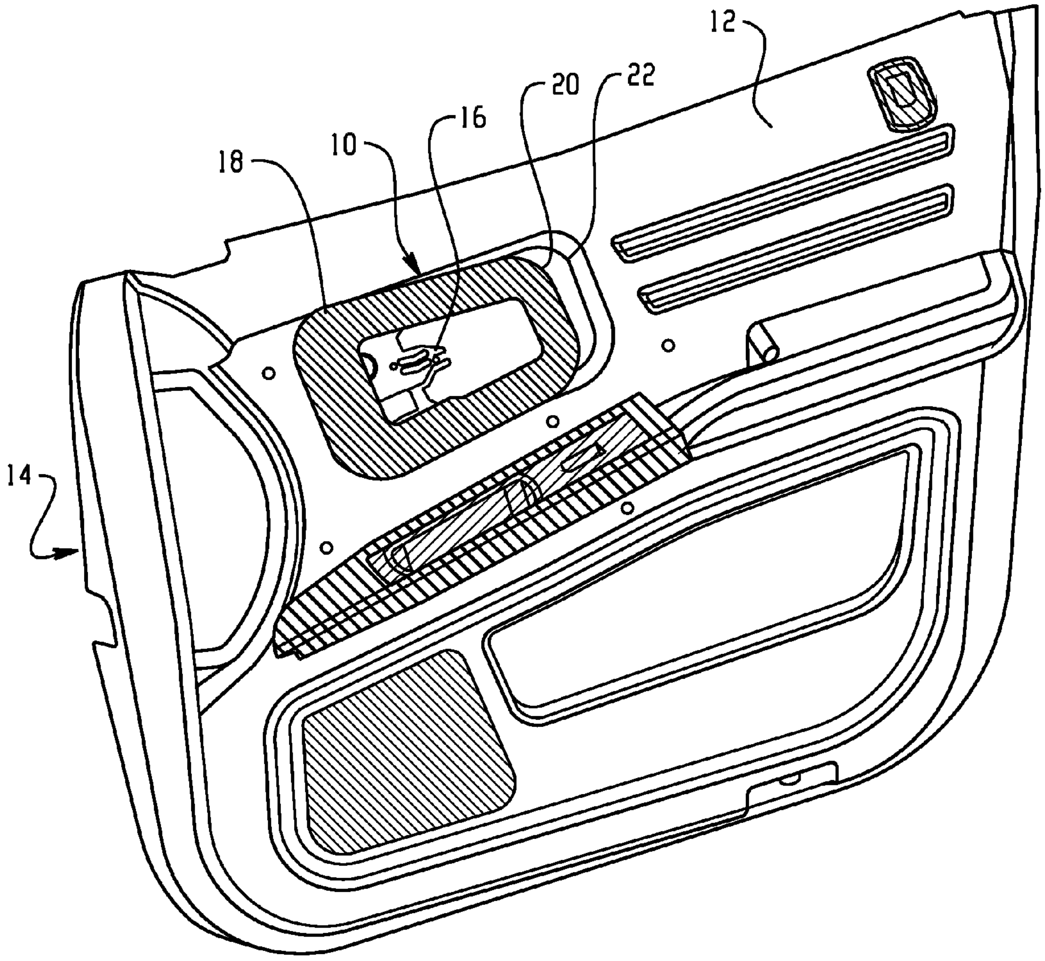
FIG. 1 depicts a view of a vehicle door grip affixed to an interior panel of a vehicle door according to an embodiment of the present invention.
Figure 2:
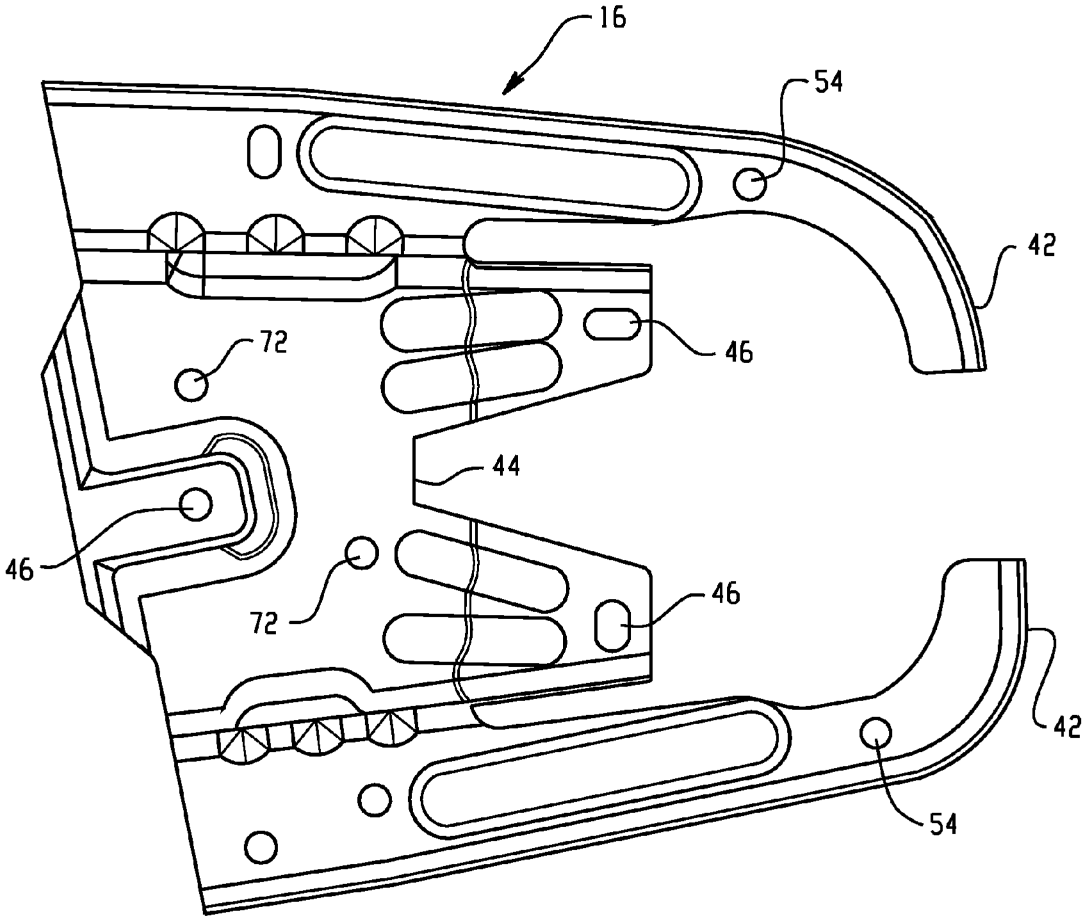
FIG. 2 is a top plan view of a bracket for a door grip according to an embodiment of the present invention.

A vehicle door grip 10 affixed to an interior panel 12 of a vehicle door 14 is shown in FIG. 1 according to an embodiment of the present invention. Door grip 10 includes a bracket 16 to facilitate mounting of the door grip to interior panel 12 with conventional fasteners such as screws (not shown). A cover 18 provides door grip 10 with a finished and esthetically pleasing appearance. A grip handle portion 20 of door grip 10 is arranged over a recessed portion 22 of interior panel 12 and is cantilevered generally away from the recessed portion by bracket 16 and/or base member 24, providing sufficient clearance to permit an occupant of the vehicle to easily grasp the handle portion and move the door. A cover (not shown for clarity) may be arranged over bracket 16 for esthetic purposes.

With reference now to FIGS. 1, 2, 3, 4, 5A and 5B in combination, door grip 10 comprises bracket 16, cover 18 and a base member 24. Details of these components and their assembly is detailed below.

Base member 24 has a generally rounded rectangular shape with a central opening 26. A rear side 28 of the base member is generally planar and has a plurality of openings 30 located proximate a base member handle portion 32. A front side 34 of the base member includes a lip 36 and a channel 38 forming an interior portion that allows bracket 16 to fit into the front side, positioned generally flush with the lip. Base member 24 may be made from any suitable material including, without limitation, molded and/or machined plastics such as ABS and polypropylene, cast and/or machined metal, and composite materials. Base member 24 may be finished so as to be esthetically compatible with the interior of the vehicle, such as color-matched, color-coordinated or chromed. Example finishes include, without limitation, molded-in colors, surface treatments, etching, painting and plating. Base member handle portion 32 may include a resilient overmold 40 such as a thermoplastic elastomer polyolefin ("TPO") to provide a comfortable, resilient tactile sensation for an occupant when opening/closing the door of the vehicle.

Figure 3:
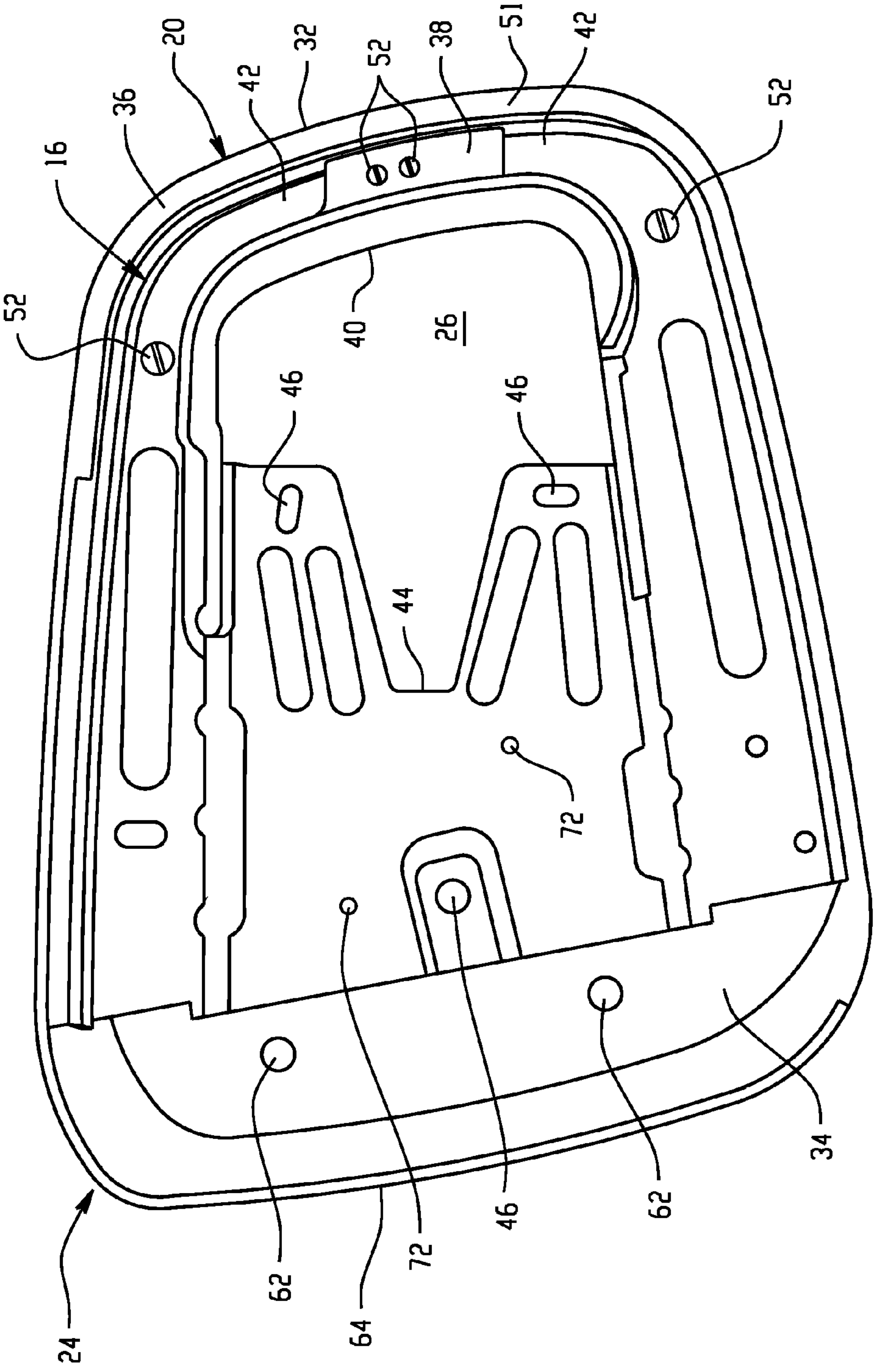
FIG. 3 is a view of a front side of a base member with the bracket of FIG. 2 fitted thereto according to an embodiment of the present invention.
Figure 4:
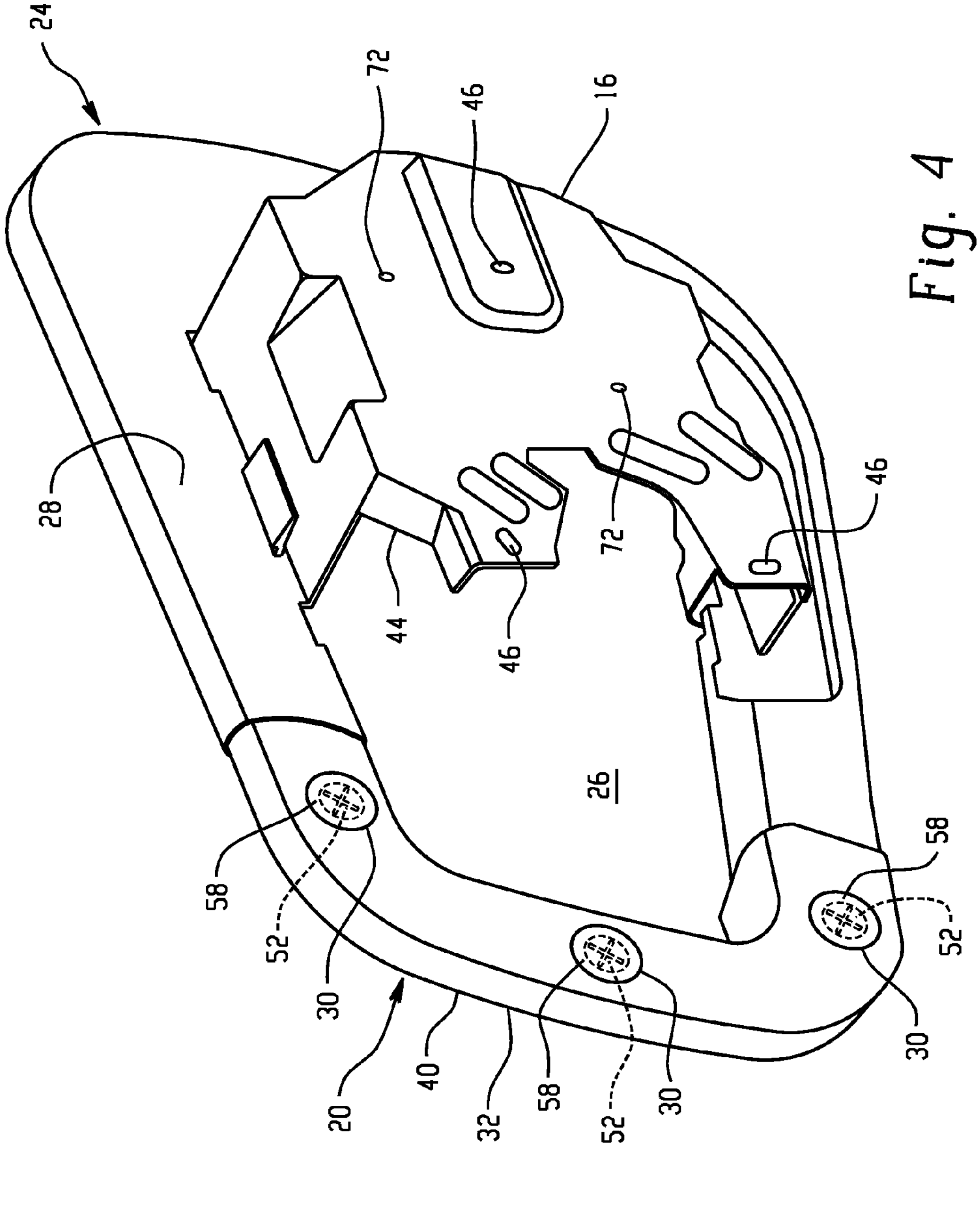
FIG. 4 shows details of a rear side of the base member of FIG. 3 and a mounting portion of the bracket of FIG. 2 according to an embodiment of the present invention.

Bracket 16 is shaped to fit into front side 34 of base member 24, as shown best in FIG. 3. A pair of support arms 42 of the bracket fit into channel 38 of base member 24 to give grip handle 20 additional structural strength and rigidity. A mounting portion 44 of bracket 16 extends through central opening 26 of base member 24 and includes one or more openings 46 to facilitate attachment of door grip assembly 10 to a structural portion of door 14. Bracket 16 may be made of any suitable material including, without limitation, plastic, metal and composites. In one example embodiment, bracket 16 may be made from stamped steel. Bracket 16 may optionally be finished by plating or painting to prevent corrosion.

Figure 5A:
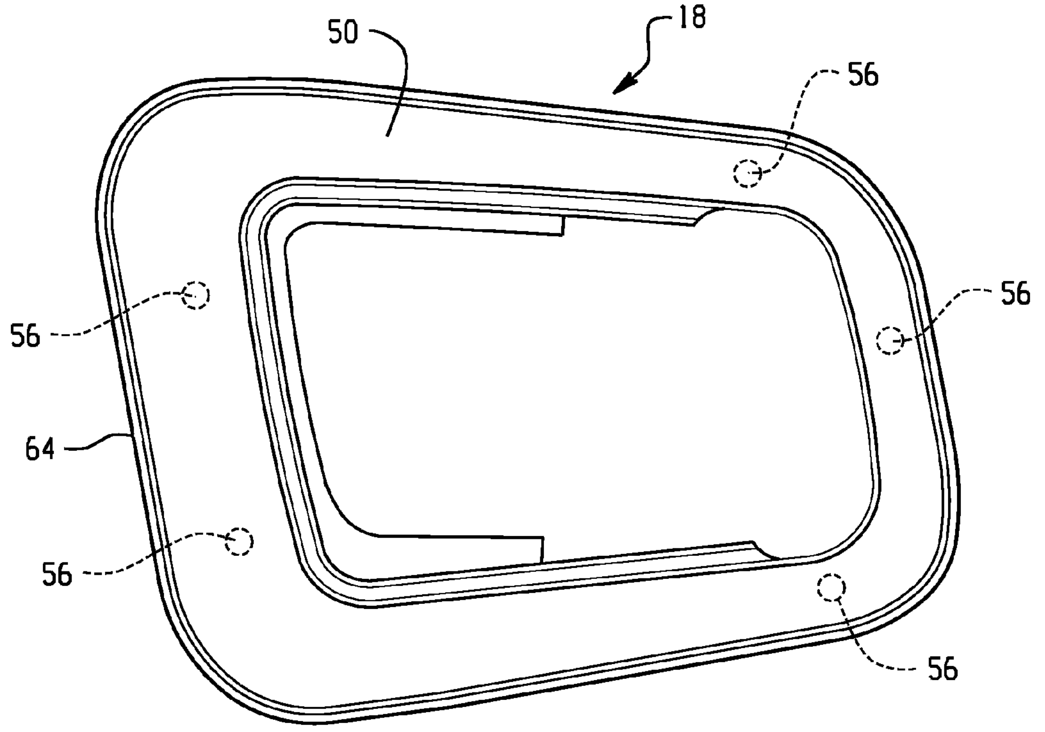
FIG. 5A is a view of a front side of a cover according to an embodiment of the present invention.
Figure 5B:
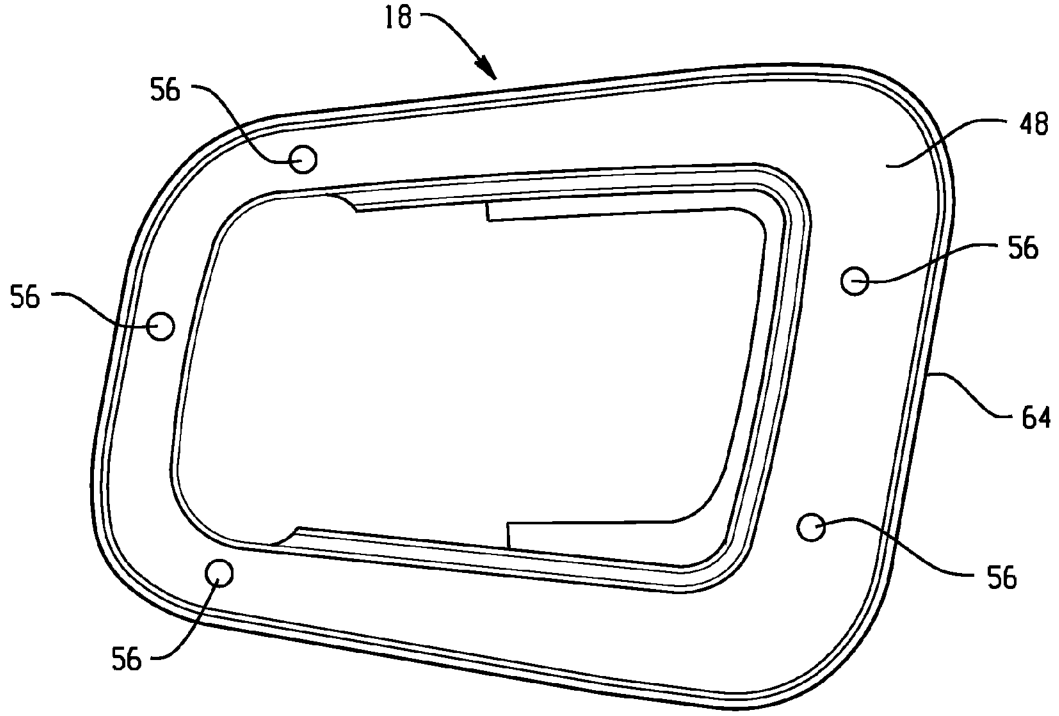
FIG. 5B shows a rear side of the cover of FIG. 5A according to an embodiment of the present invention.
Figure 6:
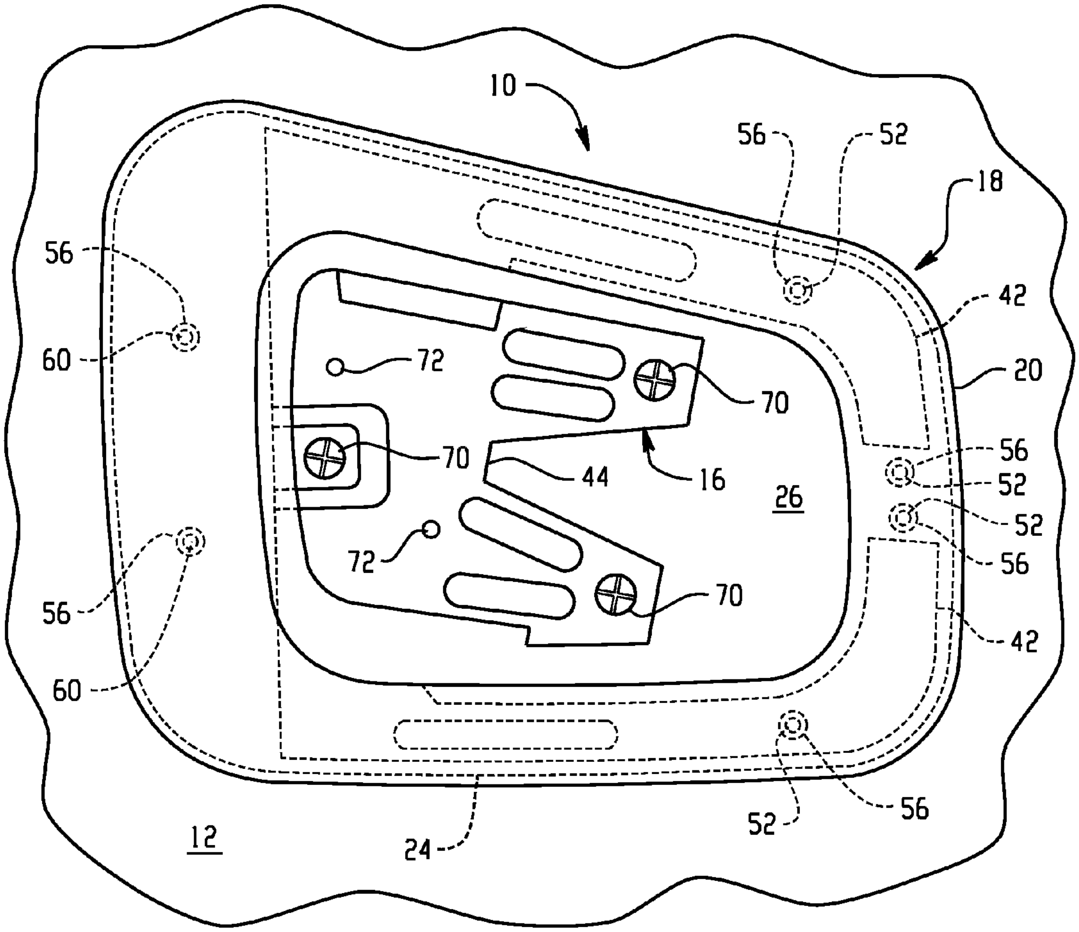
FIG. 6 depicts a vehicle door grip assembly according to an embodiment of the present invention.

With reference to FIGS. 5A and 5B in conjunction with FIG. 3, cover 18 is shaped to generally correspond with the shape of base member 24 such that lip 36 of the base member fits proximate or into a rear side 48 of the cover. Cover 18 may be made from any suitable material including, without limitation, molded and/or machined plastics such as ABS and polypropylene, cast and/or machined metal, and composite materials. Cover 18 may be finished so as to be esthetically compatible with the interior of the vehicle, such as color-matched, color-coordinated or chromed. Example finishes include, without limitation, molded-in colors, surface treatments, etching, painting and plating. At least a portion of a front side 50 of cover 18 may optionally include a resilient overmold of TPO.

With reference now to FIGS. 1-6 in combination, door grip 10 is assembled by placing bracket 16 into front side 34 of base member 24 such that support arms 42 fit into channel 38 and mounting portion 44 extends through central opening 26. A resilient gasket material 51 such as TPO may optionally be applied to lip 36. Cover 18 is then aligned over front side 34 of base member 24, sandwiching bracket 16 between the base member and the cover. Fasteners 52, such as screws, are installed into openings 30 of base member handle portion 32 and through openings or spaces 54 in bracket 16, and secured by retaining devices 56 of cover 18 to hold the base member, bracket and cover together. Retaining devices 56 may be any conventional type of retaining device compatible with fasteners 52 including, without limitation, self-threading, threaded, push-in, snap-in, and adhesive retainers. Push-in or snap-in trim caps 58 may optionally be installed to close off openings 30 after door grip 10 is assembled. Another set of fasteners 60, such as screws, are installed through interior panel apertures 62 in base member 24, optionally through openings (not shown) in bracket 16, and into corresponding retaining devices 56 of cover 18 to hold the base member, bracket and cover together proximate an end portion 64 of the base member.

It should be noted that the method of assembly of base member 24, bracket 16 and cover 18 is not critical. As such, the numbers and locations of openings 30, 62, associated fasteners 52, 60 respectively, and associated retaining devices 56 may be varied as desired. Further, alternate assembly means may be used instead of or in addition to fasteners and retainers including, without limitation, adhesives, molding, press-fit and sonic welding.

With continued reference to FIGS. 1 through 6, door grip 10 is affixed to door 14 by inserting fasteners such as screws 70 (FIG. 6) into openings 46 of mounting portion 44 and coupling the screws to corresponding mounting holes of a suitable structural portion of the door. Door interior panel 12 may include an opening sufficient to allow mounting portion 44 to directly come into contact with the structural portion of door 14. Alternatively, door interior panel 12 may include one or more openings sized and arranged to generally correspond to openings 46 such that fasteners 70 pass through openings 46 and then through the corresponding openings in the door interior panel before being coupled to the mounting holes of the structural portion of door 14. In this way fasteners 70 function to secure both door grip 10 and door interior panel 12 to door 14. It should be noted that the method of mounting door grip 10 to door 14 is not critical. As such, the numbers and locations of openings 46 may be varied as desired. The number and type of fasteners 70 may likewise vary. After door grip 10 is affixed to door 14 an appropriately shaped decorative cover (not shown for clarity) may be inserted into central opening 26 and secured in any conventional manner, such as with adhesive or with fasteners coupled to openings 72 of mounting portion 44.

Once installed to door 14, grip handle 20 is positioned by mounting portion 44 such that it is cantilevered away from door interior panel 12 for easy accessibility by a user. In use, an occupant grasps grip handle 20 and pushes it to open the door or pulls it to close the door. Support arms 42 of bracket 16, interposed between base member 24 and cover 18 provide door grip 10 with additional structural strength and rigidity.

While this invention has been shown and described with respect to a detailed embodiment thereof, it will be understood by those skilled in the art that changes in form and detail thereof may be made without departing from the scope of the claims of the invention.

What is claimed is:

1. A door grip for a vehicle, comprising:

a stationary, generally planar base member having an interior portion and further including a handle portion defined by a peripheral structural member surrounding a central opening therethrough;

a bracket having a single mounting portion and a pair of opposing, generally planar support arms extending from the mounting portion, the support arms being oriented on a common plane and positioned within the interior portion of the base member; and a cover coupled to the base member, the cover having a shape generally corresponding to the base member and at least partially enclosing the interior portion of the base member to sandwich the support arms therebetween, the mounting portion being at a first end of the door grip and the handle portion being at a second, opposing end thereof, the mounting portion being attachable to a vehicle door interior panel such that the handle portion is cantilevered from the mounting portion.

2. The door grip of claim 1 wherein the base member comprises a generally rounded rectangular shape.

3. The door grip of claim 1 wherein the base member further comprises a lip and a channel to form the interior portion.

4. The door grip of claim 3, further comprising a gasket material disposed upon the lip.

5. The door grip of claim 1 wherein the base member is made of at least one of ABS, polypropylene, metal, and composite materials.

6. The door grip of claim 1 wherein the base member further comprises a finish.

7. The door grip of claim 1 wherein the base member further comprises a resilient overmold portion.

8. The door grip of claim 1 wherein the mounting portion of the bracket extends through the central opening of the base member.

9. The door grip of claim 1 wherein the bracket is made of at least one of plastic, metal and composites.

10. The door grip of claim 1 wherein the cover is made of at least one of ABS, polypropylene, metal, and composite materials.

11. The door grip of claim 1 wherein cover further comprises a finish.

12. The door grip of claim 1 wherein the cover further comprises a resilient overmold portion.

13. The door grip of claim 1, further comprising at least one fastener to join the cover to the base member.

14. The door grip of claim 13, further comprising at least one trim cap disposed over the fastener.

15. A door grip for a vehicle, comprising:

a stationary, generally planar base member having a generally rounded rectangular shape, an interior portion, a central opening, a lip and a channel, the base member further including a handle portion defined by a peripheral structural member surrounding the central opening;

a bracket having a single mounting portion and a pair of opposing, generally planar support arms extending from the mounting portion, the support arms being oriented on a common plane and positioned within the interior portion of the base member and adjacent the handle portion, the mounting portion extending through the central opening;

a cover coupled to the base member, the cover having a shape generally corresponding to the base member and at least partially enclosing the interior portion of the base member to sandwich the support arms therebetween;

at least one fastener to couple the cover to the base member; and at least one trim cap disposed over the fastener, the mounting portion being at a first end of the door grip and the handle portion being at a second, opposing end thereof, the mounting portion being attachable to a vehicle door interior panel such that the handle portion is cantilevered from the mounting portion.

16. The door grip of claim 15 wherein at least one of the base member and cover further comprises a resilient overmold portion.

17. The door grip of claim 15 wherein at least one of the base member and cover further comprises a finish.

18. A method of making a vehicle door grip, comprising the steps of:

providing a stationary, generally planar base member having an interior portion and further including a handle portion defined by a peripheral structural member surrounding a central opening;

positioning a bracket within the interior portion of the base member, the bracket having a single mounting portion and a pair of opposing, generally planar support arms extending from the mounting portion, the support arms being oriented on a common plane; and coupling to the base member a cover having a shape generally corresponding to the base member so as to at least partially enclose the interior portion of the base member to sandwich the support arms therebetween, the mounting portion being at a first end of the door grip and the handle portion being at a second, opposing end thereof, the mounting portion being attachable to a vehicle door interior panel such that the handle portion is cantilevered from the mounting portion.

19. The method of claim 18, further comprising the step of adding a resilient overmold portion to at least one of the base member and cover.

* * * * *